May 14, 1957 F. O. SNOW, JR 2,792,128
UNLOADING TOWER
Filed Feb. 23, 1952 9 Sheets-Sheet 3
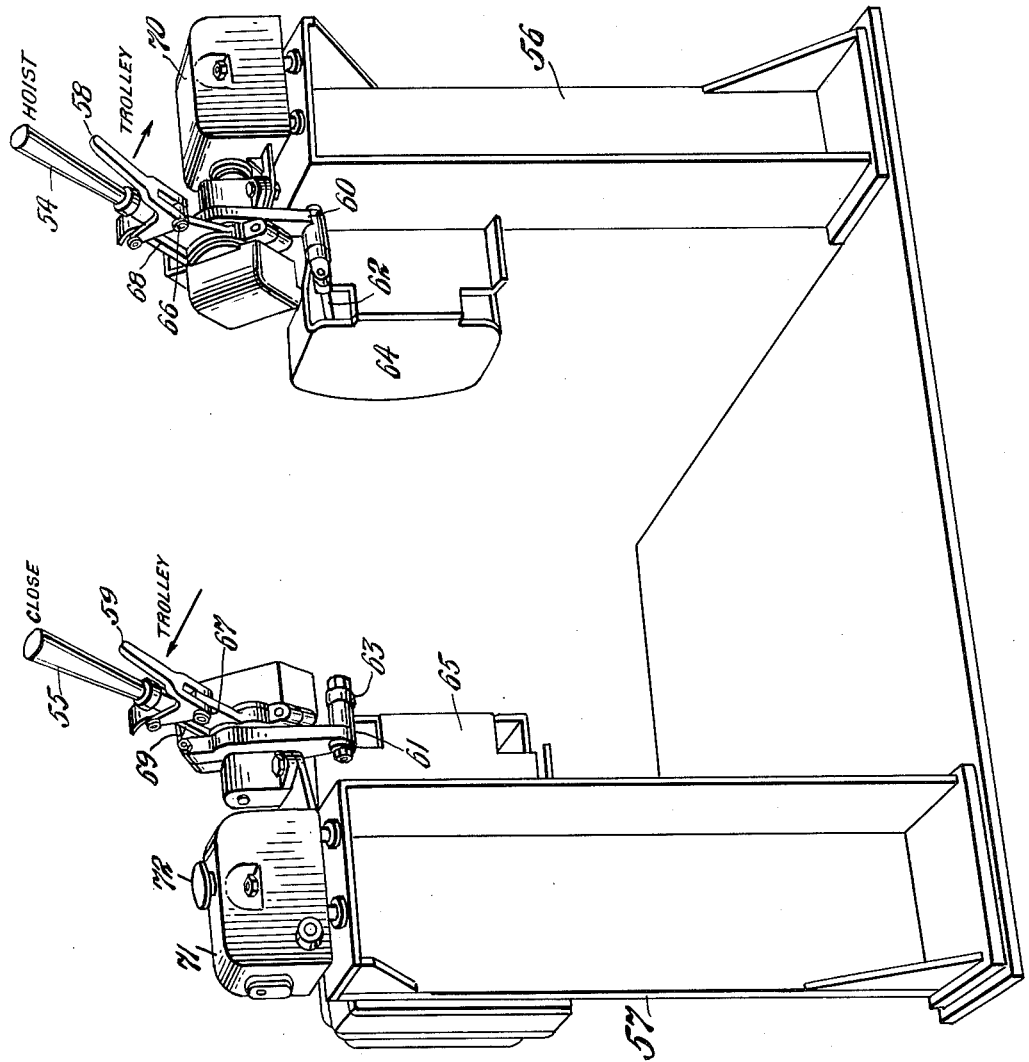
INVENTOR.
FREDERICK O. SNOW, JR.
BY
ATTORNEY

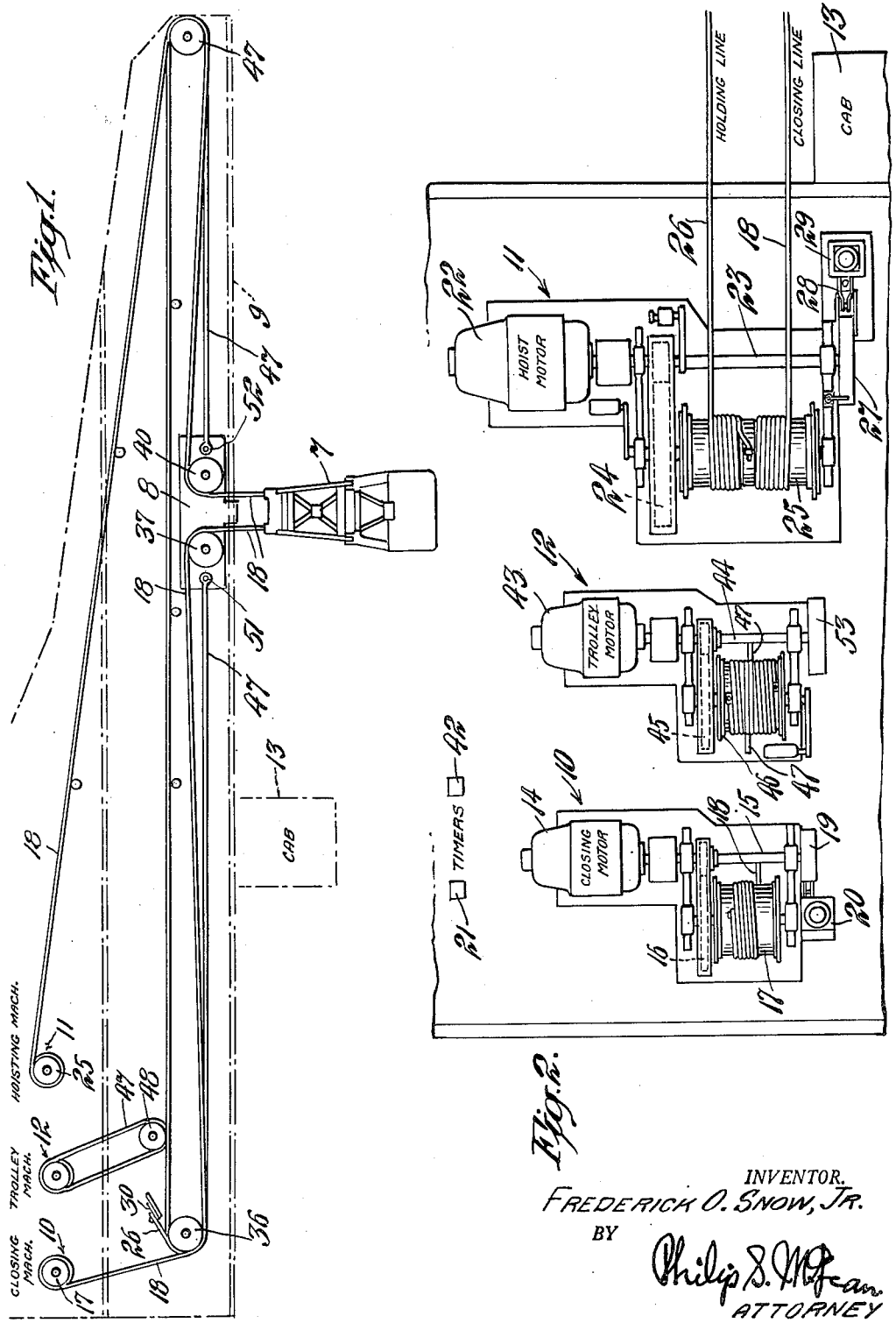

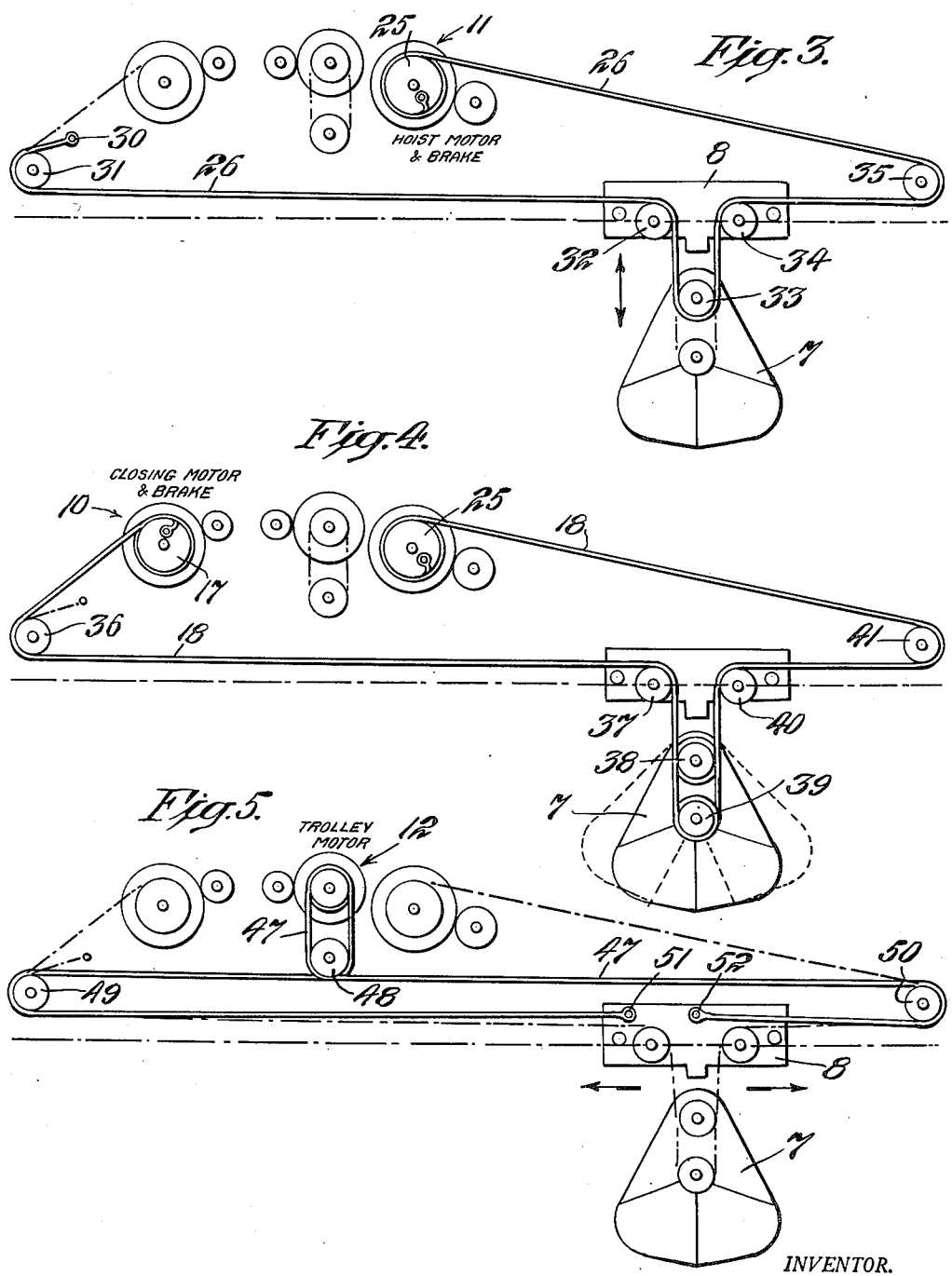

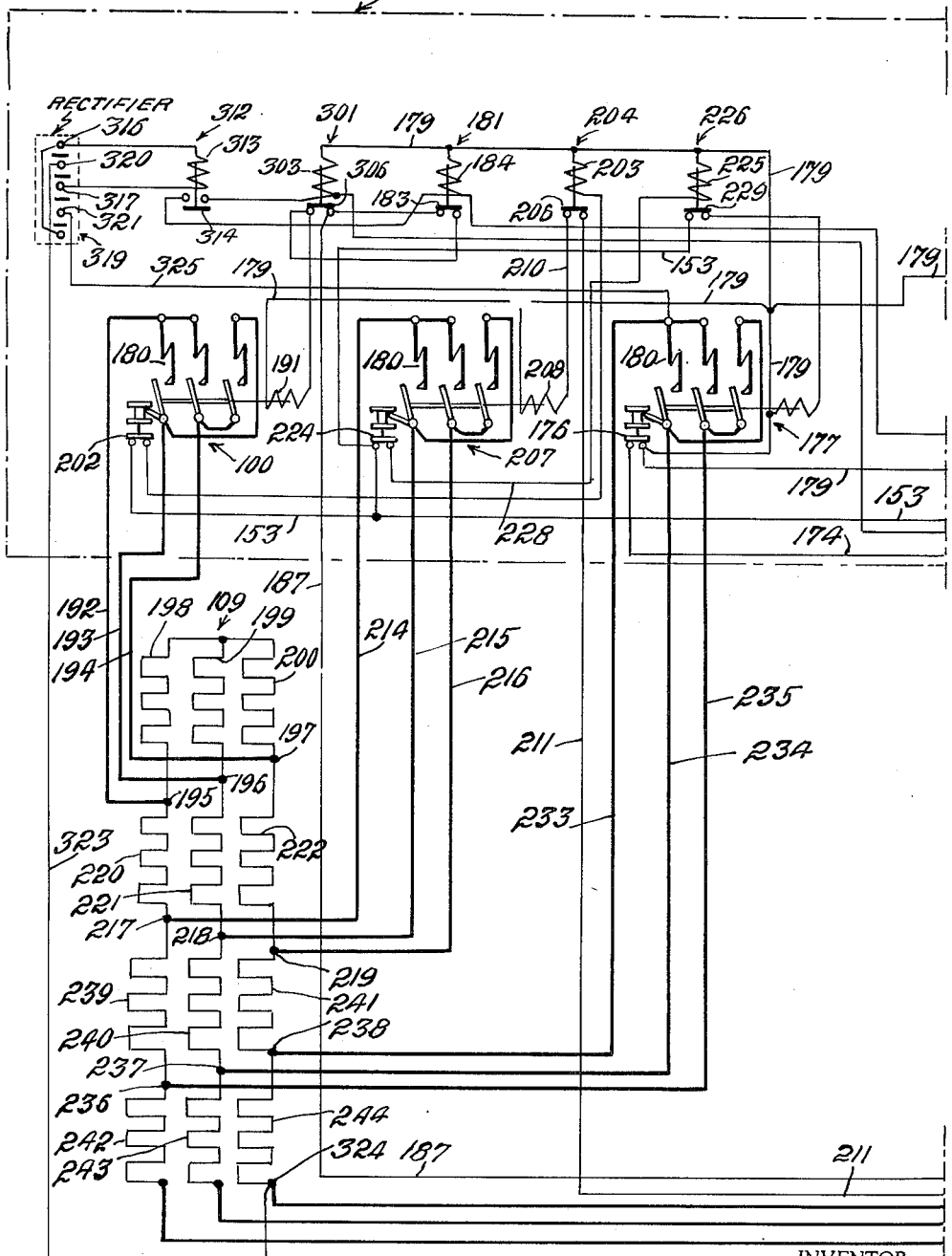

INVENTOR.
FREDERICK O. SNOW, JR.
BY
ATTORNEY

INVENTOR.
FREDERICK O. SNOW, JR.

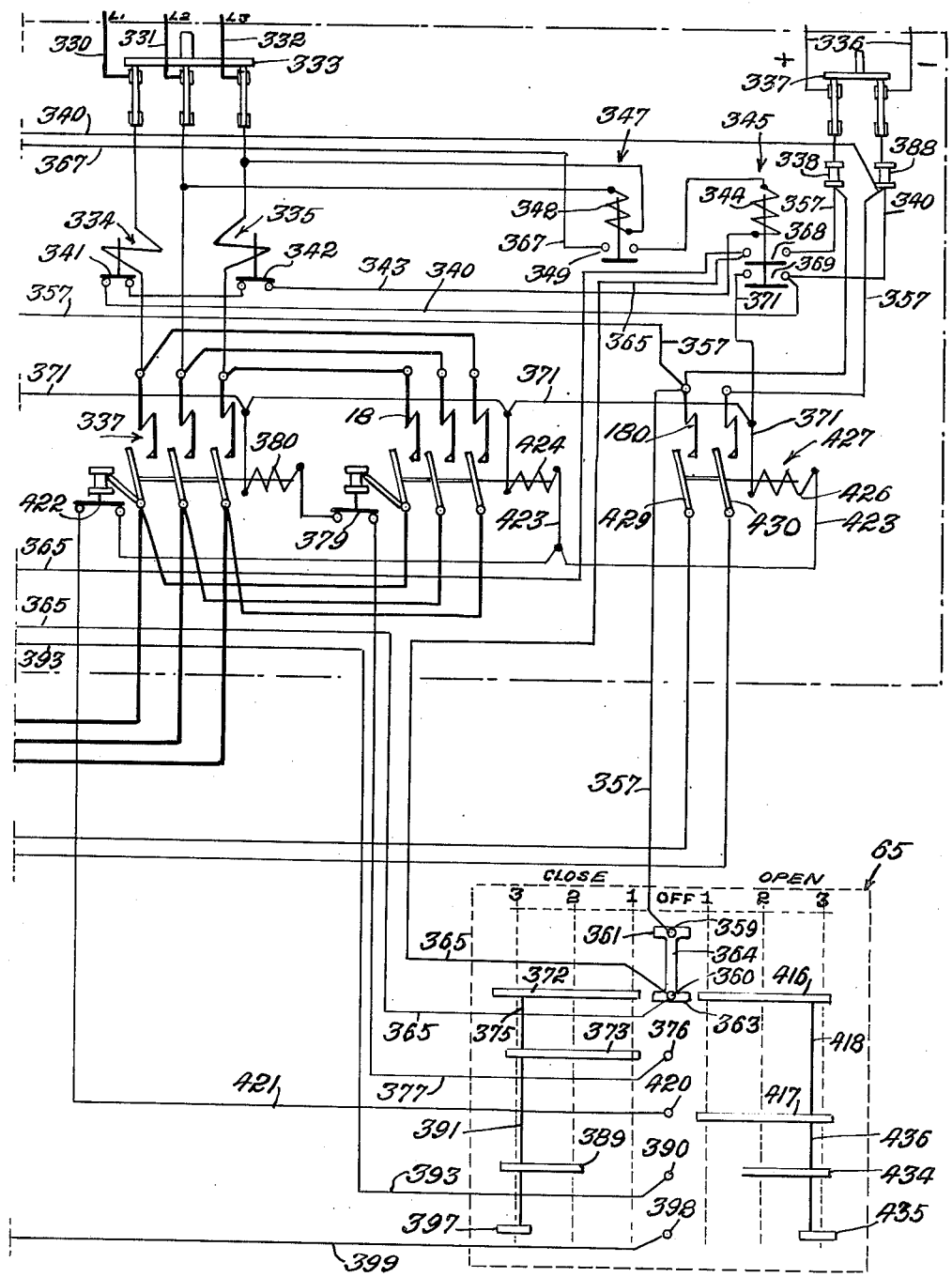

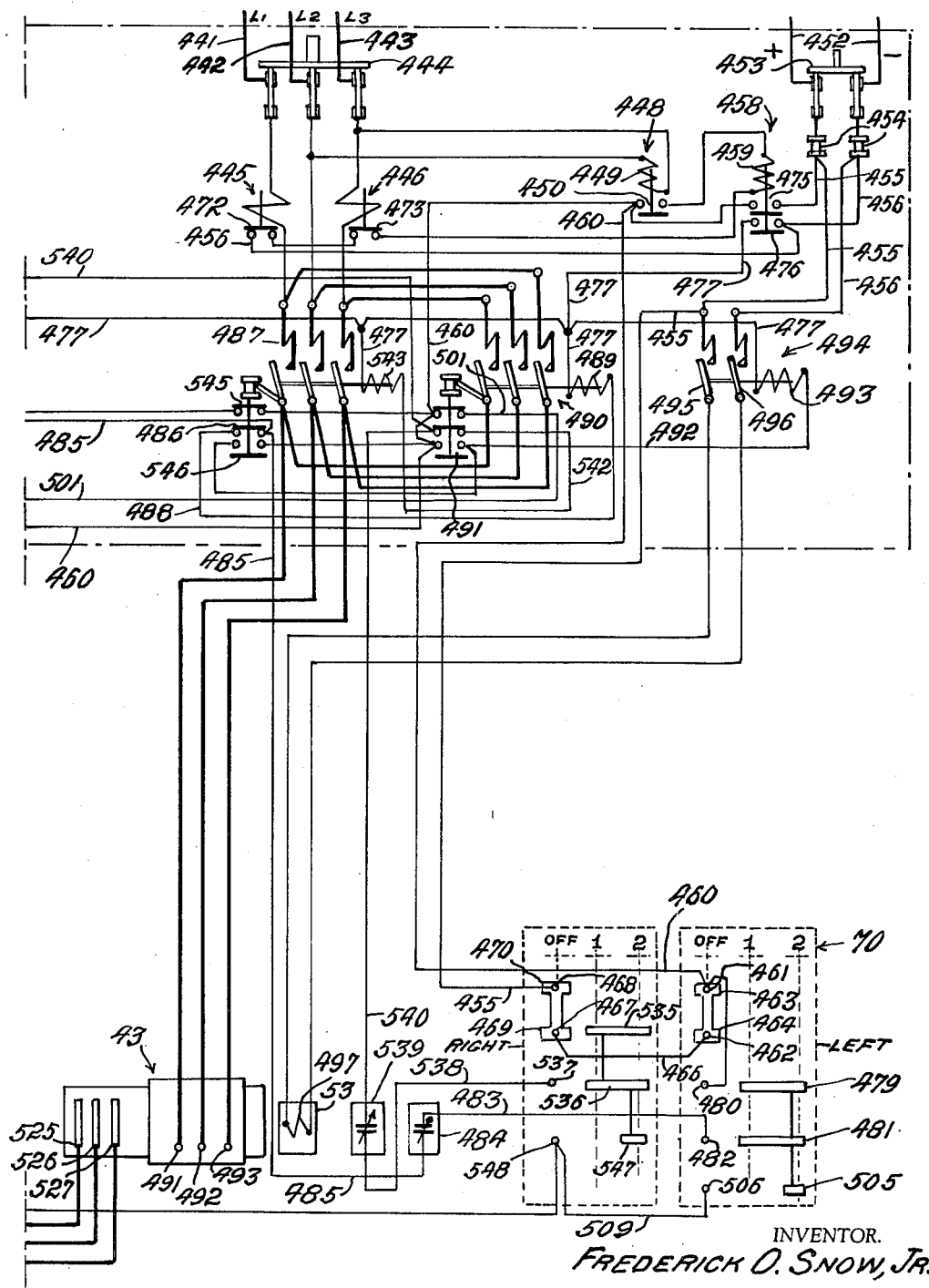

United States Patent Office 2,792,128
Patented May 14, 1957

2,792,128
UNLOADING TOWER

Frederick O. Snow, Jr., Maplewood, N. J., assignor to McKiernan-Terry Corporation, Harrison, N. J., a corporation of New Jersey Application February 23, 1952, Serial No. 273,113

5 Claims. (Cl. 212—81)

The present invention relates to apparatus for unloading coal and other bulk material from barges or other carriers.

Such apparatus may be considered as comprising a grab bucket suspended from a trolley and including separately controlled hoist, closing and trolley machines for independently effecting the hoisting and lowering, the closing and opening and the outward and inward movements of the grab.

The present invention is concerned with these various controls.

General objects of the invention are to accomplish fast, smooth, rhythmic unloading operations with a maximum of safety.

Special objects of the invention are to automatically equalize load on the closing and hoisting lines at each operation to prevent overloading of one or the other and to assure full, high speed operation without spillage or other factors resulting from inequalities or lack of control.

Further special objects of the invention are to render the machines self-protective so that if a control be inadvertently kept on for too long, as for example the closing machine, that machine will automatically shut down and hold the line taken in up to that point.

Important objects of the invention are to provide a simple, easily understood control system in which the control movements of the operator will be more or less instinctive and which can be performed without having to shift hands or go through other awkward movements.

Other desirable objects and the novel features through which the purposes of the invention are attained are set forth or will appear in the course of the following specification.

The drawings accompanying and forming part of the specification illustrate a present commercial embodiment of the invention but such structure may be modified and changed as regards the immediate illustration, all within the true intent and scope of the invention as hereinafter defined and claimed.

Fig. 1 in the drawings is a diagrammatic and part side elevation view illustrating essential features of the invention;

Fig. 2 is a broken plan view of the closing and hoist machines with automatic, one-way brakes, and the trolley machine with two-way brakes;

Fig. 3 is a diagrammatic view of the hoist or holding rope system;

Fig. 4 is a diagrammatic view of the closing rope system;

Fig. 5 is a diagrammatic view of the trolley rope system;

Fig. 6 is a perspective view of the two-handed control system.

Figs. 7, 7A, are combined views of an electrical circuit diagram showing the hoist motor and its associated controls.

Figs. 8, 8A, show a similar circuit diagram for the closing motor.

Figs. 9, 9A, illustrate a similar circuit diagram for the trolley motor.

Figure 7A:
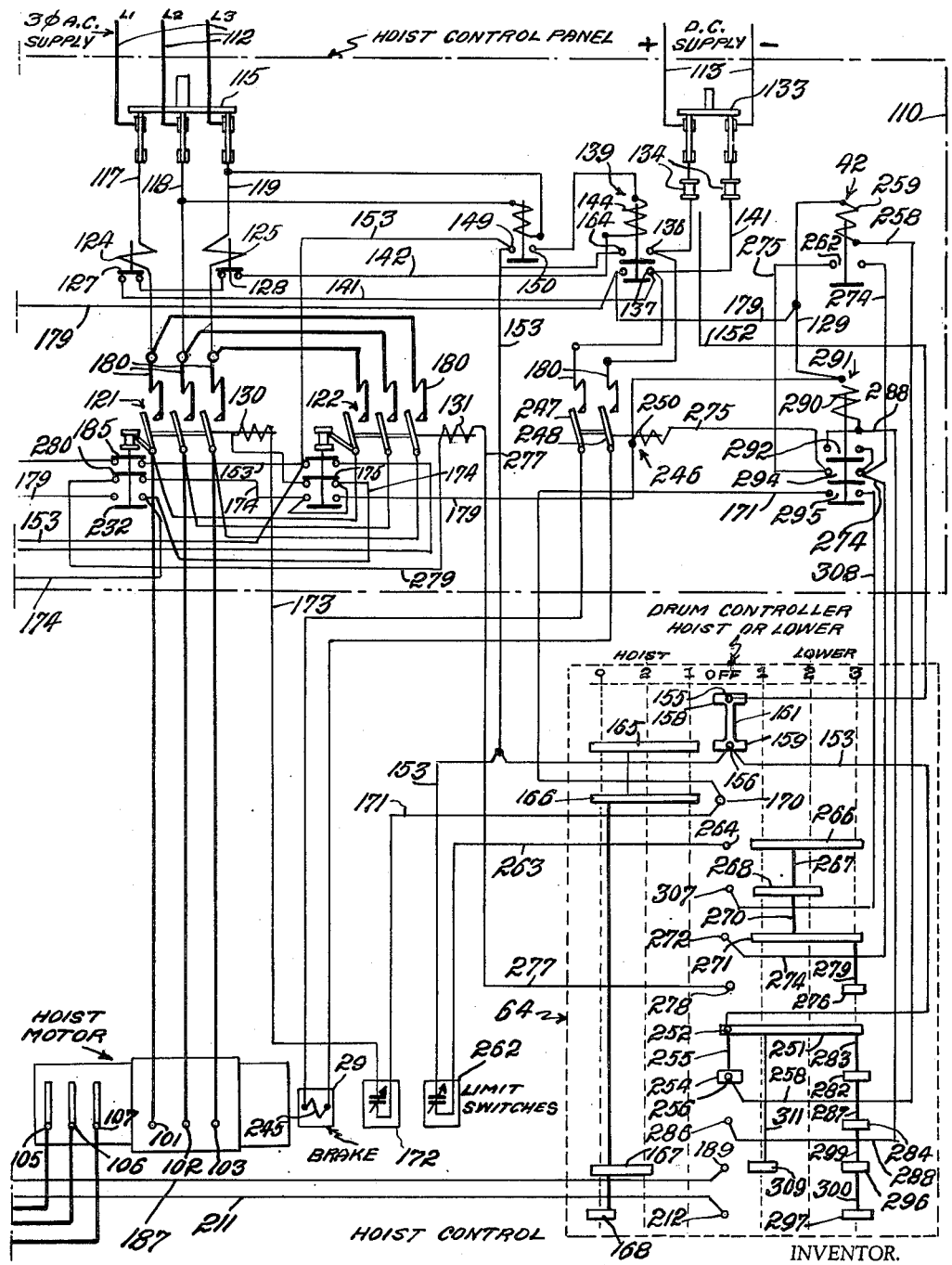

In Fig. 1 a grab bucket of the clamshell type is illustrated at 7, suspended from a trolley 8, riding on tracks carried by the outstanding boom structure 9.

This view shows the closing, hoisting and trolley machines supported in a suitable housing at 10, 11 and 12, governed by manually operable controls located in the cab 13.

Fig. 2 shows the closing machine as comprising a motor 14 operating a pinion shaft 15, geared at 16 to drive the drum 17 for the closing line 18.

A special feature of this unit is the automatic one-way brake 19 on the pinion shaft 15.

This automatic, one-way brake may be of a known design, arranged to be applied by spring pressure and to be released automatically when the motor runs in the direction to pull in rope to close the grab, and to be released by a solenoid 20 connected in the control circuit, when the motor runs in the direction to pay-out rope to open the grab.

This brake, further, is arranged to let go in the operation of the drum in the closing direction, without losing its contact with the drum, thus to instantly seize and hold up to the preset maximum load, to prevent motion in the opposite or opening direction unless purposely released by the solenoid.

A further characteristic of this automatic brake is that it is set to hold a maximum load which is approximately the weight of the empty bucket, which usually amounts to about one-half the weight of the fully loaded bucket. Consequently, this brake can slip against its own holding action if loaded to more than half the weight of the fully loaded bucket.

Another special feature of the closing machine is that the closing motor is of the torque type, designed to stall at a load of greater than one-half the weight of the fully loaded grab—in other words, at about the load of the empty bucket.

Figure 8:
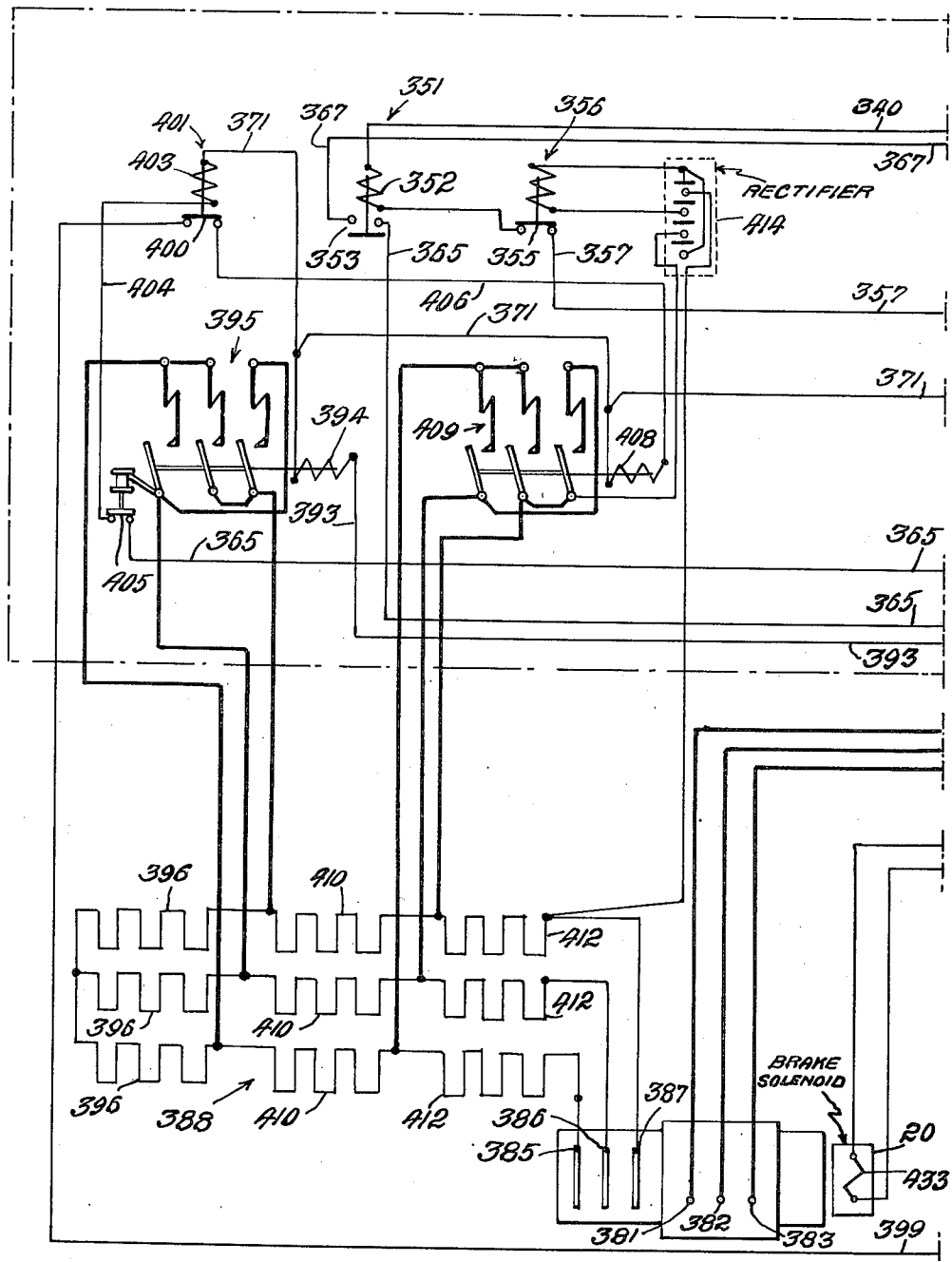

A further special feature is the provision of a timer indicated diagrammatically at 21, Figs. 2 and 8, connected to cut off the closing motor and shift the load to the brake, in a predetermined time, such as from one to one-and-one-half seconds after stalling this motor.

This timer may be a standard, current-sensitive timer actuated by stalled current of the motor to operate a relay which will cut the motor circuit.

Thus if the closing motor circuit is held closed after stalling the motor, this timer will automatically open the motor circuit and the brake will hold the line taut.

This timer circuit may be automatically re-set on each restoring of the motor control, to be described, to neutral position.

The closing motor is thus a limited torque motor adapted to stall at a load greater than the weight of the light bucket and is cut out by the timer after a predetermined limited period in the stalled or jammed condition.

The one-way automatic brake 19 thus holds on to any rope taken in and will also hold the weight of the light bucket.

Details of this brake are not shown, since its construction may vary. Brakes of this one-way automatic type are shown in a general way in Norris Patents 1,008,361 dated November 14, 1911 and 1,068,070 dated July 22, 1913. The design presently in use comprises a brake-band supported about a brake drum on the motor pinion shaft 15 and having its ends connected with a movable hanger actuated by a lever subjected to a force exerted by a brake closing spring and adapted to be shifted in the brake releasing direction by a solenoid, subject to dashpot control.

The hoisting machine is shown in Fig. 2 as comprising a motor 22 coupled to a pinion shaft 23 driving through reduction gearing 24, a drum 25 to which both the closing line 18 and the holding or hoisting line 26 are connected.

This hoisting machine, like the closing machine, includes an automatic one-way brake, indicated at 27, acting on the pinion shaft and closed by spring pressure at 28 and released automatically in the hoisting direction, but arranged to instantly catch and hold the double drum 25 when the motor 22 is cut off from hoisting and also released by a solenoid 29, connected in the control circuit, when the motor is energized in the lowering direction.

The reeving of the holding and closing lines 26 and 18 is illustrated in Figs. 3 and 4, respectively.

The holding line 26 is anchored at one end to the inboard structure, at 30, Fig. 3, and extends about the inner sheave 31, thence horizontally outwardly and downward over a trolley sheave 32, about a lifting sheave 33 in the upper head of the bucket, up over a second trolley sheave 34, from trolley sheave 34 horizontally and about the outer sheave 35, and thence back to the hoisting drum 25.

The closing rope 18 is fast at one end to the closing drum 17, Fig. 4, and extends about the inner sheave 36, out and down over trolley sheave 37, about sheaves 38 and 39 in the upper and lower heads of the bucket and over trolley sheave 40 and outer sheave 41, back to hoisting drum 25.

The hoisting machine thus takes in and pays out both holding and closing lines, simultaneously and to an equal extent. The closing line, through independent control of the closing drum, is operative at all times to open or close the bucket entirely independently of the hoisting and lowering action.

Automatic equalization of load on the hoisting or holding and closing lines is effected at each hoisting operation of the hoisting drum, without resort to special lever and spring arrangements or other forms of tension equalizing devices and without requiring any action or attention on the part of the operator.

Usually in closing the bucket the closing line 18 will be drawn taut with a maximum tension corresponding to about one-half of the weight of the loaded bucket, or sufficient to hold the weight of the empty bucket. This maximum tension is determined by the limited maximum torque of closing motor 14 and the correspondingly limited holding action of the automatic brake 19. The bucket having previously been lowered to grab a load of material, there may be some slack in the holding line at the time. Then when lifting power is put on, the hoist motor will be pulling against a taut closing line while taking slack out of the lifting line.

This pull on the closing line will cause the closing brake at 19, Fig. 2, which has been set to hold an empty bucket, to slip until the pull exercised by the holding line makes the total lift equal to that required for hoisting the loaded bucket, with load equally or proportionately carried by the two lines and no one line subjected to any overload.

This automatic line tension equalization, it will be seen, will take place on each load lifting operation of the hoisting machine.

A timer indicated at 42 in Fig. 2, is provided in the hoisting machine for limiting the free fall drop in lowering short distances and to prevent dangerous overspeeding under free fall conditions.

This may be a standard induction timer or suitable timing relay which will come into action in about one-and-one-half to three seconds or when the hoist motor exceeds a predetermined speed in lowering.

The trolley machine is shown in Fig. 2 as comprising a motor 43 driving a pinion shaft 44 and through reduction gearing 45, the racking drum 46 carrying the trolley rope 47 extending in opposite directions, Fig. 5, over lead sheaves 48 and over the inner and outer end sheaves 49, 50, to dead-end connections 51, 52, on the trolley.

A quick acting, two-way brake 53 on the pinion shaft 44 is connected to seize and hold the trolley the instant its motor 12 is cut off.

The control circuits for the hoisting, closing and trolley machines are illustrated in Figs. 7, 7A, 8, 8A and 9, 9A, respectively. The physical arrangement of the manually operable control levers by which the operator controls the motors is shown in Fig. 6.

Referring to Figs. 7, 7A, the hoisting motor 22 is a three-phase induction motor of the wound rotor type. The motor 22 has stator terminals 101, 102 and 103 and slip-ring terminals 105, 106 and 107 connected to the rotor. A bank of resistors designated generally as 109 is connected to the rotor terminals 105, 106, 107 for control of the speed and torque of motor 22 when running in either direction. There is a pedestal 56 (Fig. 6) on which an enclosed master switch or controller 64 is mounted. A hoist control lever 54 is arranged on the pedestal 56 to be conveniently grasped by the left hand of an operator. The control lever 54 is connected by a crank arm 60 and a link 62 for operation of the controller 64. The lever 54 and controller 64 are spring biased so that the controller will be returned to its neutral or "off" position whenever released by the operator and must be held appropriately positioned by the operator whenever the motor 22 is in operation.

The controller 64 has, in addition to its central "off" position, three separate positions on each side of the "off" position. When control lever 54 is moved from its "off" position forwardly away from the operator (toward the observer as seen in Fig. 6), motor 22 operates to lower the bucket. When control lever 54 is moved in the opposite direction from its "off" position, the motor 22 operates to hoist the bucket.

A group of relays and contactors for control of the hoist motor 22 is mounted on a control panel 110 outlined in Fig. 7 by a dot and dash line. Power for operation of the hoist motor 22 is supplied by a three-phase power line 112. Direct current for the operation of various control and timing relays is supplied by a direct current power line 113. A main power switch 115 is provided and is shown as a three pole single throw knife switch 115 with its upper stationary contacts connected to the three phase power line 112.

Three power conductors 117, 118 and 119 extend from the blades of knife switch 115 to the contacts of "hoist" and "lower" directional control contactors designated generally as 121 and 122, respectively. The conductors 117 and 119 extend through overload elements 124 and 125, respectively, which may be thermally actuated by the line current and may include electromagnetic windings for faster operation in the event of severe overloads. The overload elements 124 and 125 control normally closed overload contacts 127 and 128, respectively, which will open in the event of an overload. The overload contacts 127 and 128 are connected in an undervoltage circuit, later to be described.

The "hoist" contactor 121 is provided with an operating winding 130. When winding 130 is energized, the "hoist" contactor 121 closes its three main contacts and connects power conductors 117, 118 and 119 to the stator terminals 101, 102 and 103, respectively, of motor 22. The "lower" contactor 122 is similarly provided with an operating winding 131. When winding 131 is energized, the "lower" contactor 122 closes its main contacts and connects power conductors 117, 118 and 119 to stator terminals 103, 102, and 101, respectively, in the inverse order from the order established by "hoist" contactor 121. The direction of phase rotation of the stator field and hence the rotor of motor 22 is thus reversed by "hoist" contactor 121 with respect to its direction of rotation as established by "lower" contactor 122. "Hoist" contactor 121 causes rotation of the double drum 25 to reel in the hoisting and closing lines 26 and 18 and the "lower" contactor 122 causes rotation of the drum 25 to pay out both lines. The torque and resulting speed of hoist motor 22 are controlled for either direction of rotation by the resistors 109 in a manner to be described.

The direct current power line 113 is connected to the stationary contacts of a two pole single throw knife switch 133. The blades of knife switch 133 are connected through fuses 134 to stationary contacts 136 and 137 of a D. C. undervoltage relay designated generally as 139. A negative conductor 141, which extends to contact 137 also extends through the overload contacts 127 and 128 which are connected in series and through a further conductor 142 to the lower terminal of the oeprating winding 144 of D. C. undervoltage relay 139. The D. C. undervoltage relay 139 will thus always be released upon the opening of either of the overload contacts 127 or 128. The action of D. C. undervoltage relay 139 is further described below.

An A. C. undervoltage relay designated generally as 145 is provided with an operating winding 146. The operating winding 146 is connected directly to A. C. power conductors 118 and 119 so that it is energized whenever power is available on the three phase line 112 and the three-pole switch 115 is closed. Under these conditions a circuit is closed between stationary contacts 149 and 150 of the A. C. undervoltage relay 145 and this circuit is immediately opened in the event of a power failure at the A. C. power conductors 118 and 119. With A. C. undervoltage contacts 149 and 150 closed, a circuit for the energization of the winding 144 of D. C. undervoltage relay 139 is established via a positive conductor 152 and a further positive conductor 153 through the controller 64. This circuit is completed between stationary contacts 155 and 156 of controller 64. Contact 155 engages a movable drum segment 158 only in the "off" position of the controller 64. Contact 156 engages a movable drum segment 159 only in the "off" position of the controller. The segments 158 and 159 are permanently interconnected by a connection 161. In the "off" position of controller 64, a circuit is thus established from the positive side of knife switch 133 and conductor 152, controller contacts 155 and 156 which are interconnected only in the "off" position by movable members 158, 159, 161, and conductor 162 to the lower terminal of winding 144 of the D. C. undervoltage relay. As soon as the D. C. undervoltage relay 134 is energized, a circuit is completed between its upper set of stationary contacts 164, 136 so that the D. C. undervoltage relay is locked in independently of the position of the drum controller 64. However, in the event of overload, A. C. power failure or D. C. power failure, the D. C. undervoltage relay 139 will release and cannot be reoperated until the controller 64 is restored to its "off" position. This prevents the inadvertent application of power to the hoist motor 22 except by movement of the drum controller 64 commencing with its "off" position.

*Position No. 1—hoist*

When the drum controller 64 is moved from its "off" position to its first position in the hoist direction, a movable segment 165 makes contact with the stationary contact 156 instead of the "off" position segment 159. The segment 165 is permanently connected to three other segments 166, 167 and 168, later to be described. The segments 165 and 166 are effective in all three "hoist" positions of the drum controller 64 and out of circuit in all other positions. In "#1 hoist" position, a stationary contact 170 is engaged by segment 166. This connects the positive side of the D. C. supply with the right hand terminal of operating winding 130 of hoist contactor 121 over a conductor 171 from stationary contact 170, through a limit switch 172 which opens to prevent overtravel in the hoisting direction, and a conductor 173. The left hand terminal of the operating winding 130 of hoist contactor 121 is connected to the negative side of the D. C. supply via a conductor 174 which extends through normally closed auxiliary contacts 175 of the "lower" contactor 122 and normally closed auxiliary contacts 176 of a third step or full speed accelerating contactor 177, later to be described in greater detail. From the closed contacts 176, the circuit of contactor coil 121 extends to the negative side of the D. C. supply via a conductor 179, the closed contacts 137 of normally energized D. C. undervoltage relay 139 and the conductor 141. The "hoist" contactor 121 thereupon closes its contacts connecting three-phase power from line conductors 117, 118 and 119 to the "hoist" motor stator terminals 101, 102 and 103, respectively. The three poles of the "hoist" contactor are provided with the usual individual blowout coils 180 which reduce arcing upon contact opening under load, thereby increasing contact life. Other contacts which open under load and are subject to arcing are similarly equipped with blowout coils 180.

When "hoist" contactor 121 firt closes, the rotor slip ring terminals 105, 106 and 107 of hoist motor 22 are connected together in Y arrangement through the maximum or full resistance of the resistor bank 109. This provides a minimum initial value of rotor current, low power input to the stator, and a high starting torque as is well known in the operation of wound rotor induction motors of the polyphase type.

Prior to the operation of "hoist" contactor 121, a "hoist plug time relay" 181 was energized so that its contacts 183 were held open. The purpose of time relay 181 is to provide a short minimum time interval of high torque at low power for inching the grab 7 upwardly by repeated applications of low power to the hoist motor 22, this operation being commonly referred to as "plugging" of the hoist motor 22. Time relay 181 is of the slow release type. The relay 180 has an operating winding. The operating winding 184 is energized from the direct current supply so that relay 181 is caused to be of the fast operating, slow release type by the provision of a short-circuited winding or a copper slug surrounding its magnetic circuit to delay release by the generation of a circulating current upon deenergization of relay winding 184. Alternative forms of delay means may be used, if desired, such as dashpot control, a mechanical escapement device, thermal means, a capacitor charging circuit or the like.

The energizing circuit for winding 184 of delay relay 181 includes the negative conductor 179 which extends through contacts 137 of D. C. undervoltage relay 139. The lower terminal of winding 184 is connected to the positive side of the D. C. supply through closed auxiliary contacts 185 of "hoist" contactor 121 which open upon the application of power to the hoist motor 22. The contacts 185 of "hoist" contactor 121 which open upon closed contacts 164—136 of D. C. undervoltage relay 139 to the positive side of the D. C. supply 113. Thus, immediately upon the operation of "lower" contactor 121, the winding 184 of "hoist plug time relay" 184 is deenergized and a timing interval is commenced at the expiration of which relay 181 will close its contacts 183. Closure of contacts 183 in the "#1—hoist" position of drum controller because the circuit of contacts 183 which extends to drum controller 64 over a conductor 187, is open at the drum controller segment 167 in the "#1—hoist" position. At the expiration of the time interval of relay 181, however, the contacts 183 prepare an energizing circuit for the operation of a first step accelerating contactor 188, this circuit being completed upon advancing the drum controller 64 to position "#2—hoist" and remaining completed in position "#3—hoist" as described below.

*Position No. 2—hoist*

When the drum controller 64 is advanced from the position "#1—hoist" to its position "#2—hoist" the segment 167 engages a stationary contact 189 which is connected via the conductor 187 to contacts 183 of timing relay 181 described above. If contacts 183 are already closed, a circuit is completed to the right hand terminal of the operating winding 191 of first step accelerating contactor 188, the conductor 187 being connected to the positive side of the D. C. supply 113 through drum controller 165, stationary drum controller contact 156 and conductor 153 through contacts 164—136 of D. C. under-voltage relay 139. This operates the first step accelerating contactor 188, causing it to close its contacts which are connected by conductors 192, 193 and 194 to junction points 195, 196 and 197 of resistor bank 109. This connection short-circuits resistors 198, 199 and 200 leaving the remainder of resistor bank 109 Y-connected to rotor terminals 105, 106, and 107, but with a reduced resistance in each phase. As a result, the power input to stator terminals 101, 102 and 103 is increased and the hoist motor 22 tends to accelerate. If the drum controller 64 is advanced immediately to its "#2—hoist" position without appreciable delay in the "#1—hoist" position, the first accelerating contactor will not operate until after the expiration of the time interval provided by the "hoist plug time relay" 181.

The first accelerating contactor 188 is provided with normally closed auxiliary contacts 202. Prior to the operation of the first step accelerating contactor 188, an energizing circuit was closed for the operating winding 203 of a first acceleration time delay relay 204. The time delay relay 204 is of the fast operating slow release type like the relay 181 described above. The operating winding 203 is connected to the negative side of the D. C. supply 113 via conductor 179 and to positive conductor 153 through contacts 202 of accelerating contactor 188. When contactor 188 closes, the contacts 202 open deenergizing the winding 203 of timing relay 204. At the expiration of its predetermined timing interval, the relay 204 contacts its contacts 206 whereby an energizing circuit is prepared for a second step accelerating contactor 207. The accelerating contactor 207 is provided with an operating winding 208, the right hand terminal of which is connected by a conductor 210 to the contact 206 of time relay 204. The left hand terminal of winding 208 is connected through D. C. undervoltage relay 139 to the negative side of D. C. supply 113 via the conductor 179. The energizing circuit for the second step accelerating contactor 207 is open at controller 64, however, and is not completed until drum controller 64 is advanced to its "#3—hoist" position as described below.

*Position No. 3—hoist*

The contacts 206 of timing relay 204 are connected by a conductor 211 to a stationary contact 212 of drum controller 64. Only when the drum controller 64 is in its "#3—hoist" position, the stationary contact 212 is engaged by the segment 168. This engagement connects the positive conductor 153 through the interconnected drum controller segments 165 and 168 to the operating winding 208 of second step accelerating contactor 207, the circuit being completed through conductors 210 and 211 and through the closed contacts 206 of timing relay 204. If contacts 206 are not already closed, the operation of accelerating contactor 207 must await the expiration of the time interval of time delay relay 204. The contacts of contactor 207 are connected by conductors 214, 215 and 216 to junction points 220, 221 and 222, respectively of resistor bank 109. Operation of accelerating contactor 207 short-circuits resistors 220, 221 and 222 of resistor bank 109 by establishing a three-way connection at their lower ends among the junctions 217, 218 and 219.

The second step accelerating contactor 207 is provided with auxiliary contacts 224. Prior to the operation of contactor 207, its auxiliary contacts 224 are closed and an energizing circuit is maintained therethrough for the operating winding 225 of a second accelerating time delay relay 226. The upper terminal of winding 224 is connected to the negative conductor 179, the circuit to the lower terminal of winding 224 is completed through a conductor 228 and through the auxiliary contacts 224 of contactor 207 to the positive conductor 153. Thus upon operation of accelerating contactor 207, the timing relay 226 commences its timing interval.

At the expiration of the timing interval of timing relay 226, it closes its contacts 229. Closure of contacts 229 completes an energizing circuit for the operating winding 230 of the third accelerating contactor 177. As described above, the third accelerating contactor 177 is provided with normally closed auxiliary contacts 176 which are included in the circuit of the operating winding 130 of "hoist" contactor 121. The auxiliary contacts 176 of the third accelerating contactor 177 are short-circuited by normally open auxiliary contacts 232 of "hoist" contactor 121. Thus, when contacts 176 open with power applied to motor 22, nothing happens. If however, the drum controller 64 should be suddenly moved to its "off" position and back to its "#3—hoist" position, the "hoist" contactor could not be closed to re-apply power to motor 22 until after the third accelerating contactor 177 had released and closed its auxiliary contacts 176. This will assure recycling of the timing relays 181, 204 and 226 so that full power will be re-applied to the rotor circuit only in the usual progressively timed cycle.

The main contacts of the third accelerating contactor 177 are connected by conductors 233, 234 and 235 to junction points 236, 237 and 238, respectively. When the main contacts of contactor 177 are closed, a three-way connection is established among the junctions 236, 237 and 238, thereby short-circuiting resistors 239, 240 and 241. This leaves a minimum of three Y-connected resistors 242, 243 and 244 connected in the rotor circuit of the motor 22. Motor 22, under this condition draws maximum power for full speed hoisting operation of the grab bucket 7.

Regardless of the speed with which the drum controller 64 is moved from its "off" position to its "#3—hoist" position, the resistors in resistor bank 109 will be progressively short-circuited at a rate which can be no faster than that permitted by the timing relays 181, 204 and 226. The resistors may be progressively short-circuited as slowly as desired, however, by slowly advancing the drum controller 64 from one position to the next.

*Brake release*

When the drum controller 64 is moved from its "off" position to its "#1—lower" position, the grab 7 may be lowered. However, before the grab 7 may be lowered, it is necessary to release the brake 27. As previously stated, the brake 27 is a one-way brake which does not need to be released for hoisting operation. The brake 27 is set in the "off" position of controller 64 and remains set in all three hoist positions, no electrical brake-releasing actuation being required to permit reeling in of the close and hoisting lines 18 and 26 on the drum 25. The brake 27 seizes instantly upon discontinuing the reeling in operation of drum 25 and the lines 18 and 25 cannot be payed out to lower the grab 7 until the brake 27 is first released, a solenoid 29 (Figs. 2 and 7) being provided for this purpose. As shown in Fig. 7, the solenoid 29 has an operating winding 245.

A brake control contactor 246 is provided for connecting the brake releasing winding 245 to the D. C. supply 113. The brake 27 is set to hold the grab 7 at all times except when the winding 245 is energized. The contactor 246 is a two-pole normally open type of contactor and is provided with blowout coils 180. Two contacts 247 and 248 of brake control contactor 246 connect the brake release winding 245 directly to the negative and positive sides, respectively, of the D. C. supply 113 when the contactor 246 is operated. The brake control contactor 246 is provided with an operating winding 250.

Off position

In the "off" position of drum controller 64, a segment 251 engages a stationary contact 252 and this engagement is maintained for all "lower" positions of drum controller 64. Segment 255 is permanently connected to an adjacent segment 254 by a connection 255. Segment 254, in the "off" position, engages a stationary contact 256. Contact 265 is connected via a conductor 258 to the lower terminal of the operating winding 259 of timer 42 referred to above in connection with Fig. 2. The timer 42 is shown in Fig. 7 as a fast-operate slow release relay similar to the relays 181, 204 and 226 described above. The circuit for energization of the operating winding 259 of brake timing relay 42 is completed to the positive side of the D. C. supply 113 through drum controller segments 252 and 254 through D. C. undervoltage relay 139 and the positive conductor 153. The upper terminal of winding 259 is connected to the negative conductor 179. The segment 254 thus holds winding 259 energized in the "off" position of drum controller 64. This correspondingly maintains contacts 262 of brake timing relay 260 closed with drum controller 64 in the "off" position. The circuit through brake timing relay contacts 262 is incomplete in the "off" position, but is closed in other positions as described in detail below. The timing relay 262 is of the fast operating slow release type similar to timing relays 181, 204 and 226 referred to above. Brake timing relay 260 will therefore hold its contacts 262 closed for a predetermined time interval after its winding 259 has been deenergized by the movement of drum controller 64 from its "off" position.

Movement from "off" position to Position No. 1—Lower

The positive conductor 153 extends through the normally closed contacts of a "lower" limit switch and a conductor 263 to a stationary drum controller contact 264. A segment 266 engages the stationary contact 264 in all "lower" positions of the drum controller 64 except the "off" position. Segment 266 is connected with a counter-torque segment 268 which is closed only in position "1—lower" and in position "#2—lower." As described below, counter-torque segment 268 is effective only when moving drum controller 65 from position "#3—lower" toward the "off" position.

Segment 266 is also connected through a further connection 270 with a brake release segment 271. When drum controller 64 is moved from its "off" position to its "#1—lower" position, the positive conductor 153 is connected through limit switch 262, conductor 263, contact 264, segment 266, connections 267 and 270, and segment 271 to a stationary contact 272. Contact 272 thereupon energizes the winding 250 of brake release contactor 246 through a circuit which extends from contact 272 via a conductor 274, the previously closed contacts 262 of brake timing relay 260 and a further conductor 275 to the right hand terminal of the brake release contactor operating winding 250. The left hand terminal of winding 250 is conected to the negative conductor 179. Simultaneously with the energization of brake release contactor energizing winding 250, the winding 259 of brake timing relay 260 is deenergized by disengagement of segment 254 from stationary contact 256. Brake timing relay 260 thereupon commences its timing interval at the expiration of which its contacts 262 open. The opening of contacts 262 releases brake contactor 246 deenergizing brake solenoid winding 245 to apply the brake 27 to drum 25. During this operation the hoist motor 22 is idle and the grab 7 may drop by gravity. The controlled time interval provided by the timer or brake timing relay 42 permits the repeated downward inching of the grab 7 by gravity alone, this being accomplished by moving the drum controller 64 from its "off" to its "#1—lower" position and quickly back to its "off" position.

In advancing the drum controller 64 from its "#1—lower" position to its "#2—lower" position, nothing takes place.

Movement from No. 1 or No. 2 position to No. 3 position—lower

When the drum controller 64 is moved to its "#3—lower" position, the hoist motor 22 becomes accelerated to its full speed in the lowering direction. A segment 276 engages a stationary contact 278. The segment 276 is connected with the segment 266, described above, through the connections 267, 270 and a further connection 279. This engagement of segment 276 connects the positive conductor 153 to the right hand terminal of the operating winding 131 of the "lower" contactor 122 through a conductor 277. The left hand terminal of winding 131 is connected to the negative conductor 179 by a circuit which comprises a conductor 279, normally closed contacts 280 of "hoist" contactor 121, conductor 174 and normally closed contacts 176 of the third accelerating contactor 177. Operation of the "lower" contactor 122 energizes the stator terminals 101, 102, and 103 of hoist motor 22 to rotate the drum 25 to pay out the lines 18 and 26.

A segment 282, which is connected to the segment 251 by a connection 283, engages the stationary contact 256. This holds the brake timing relay 42 operated in the "#3—lower position" in the same manner as in the "off" position.

In the "#3—lower" position, a segment 284 engages a stationary contact 286. The segment 284 is connected to the segment 251 by the connection 283 and a further connection 287. When segment 284 engages stationary contact 286, a circuit is established from the positive conductor 153 via a conductor 288 to the operating winding 290 of a countertorque relay 291. The countertorque relay 291 is provided with a set of normally open locking contacts 292 which close when the countertorque relay 291 operates. The locking contacts 292 connect the winding 290 of countertorque relay 291 so that it will remain energized under control of segment 271 via conductor 274 so long as the drum controller 64 is any one of the three "low" positions and will be unlocked when the drum controller 64 is moved to the "off" position.

The countertorque relay 291 also comprises a set of normally open brake control contacts 294 which close simultaneously with the closure of the locking contacts 292. The brake control contacts short circuit the contacts 262 of brake timing relay 42 and connect the winding 250 of brake contactor 246 so that it will be energized from segment 271 in all three "lower" positions of the drum controller 64. This keeps the brake 27 released until the controller 64 is returned from its "#3—lower" position to its "off" position. The countertorque relay 291 also comprises a set of normaly open countertorque contacts 295 which prepare a countertorque circuit, later to be described.

The controller 64 also comprises two segments 296 and 297 which are effective only in the "#3—lower" position. The segments 296 and 297 are connected with the segment 251 through connections 283, 287, 299 and 300. In the "#3—lower" position, the segments 296 and 297 establish contact with stationary contacts 199 and 212, respectively, so that energizing circuits are prepared for the operation of the first and second accelerating contactors 188 and 207, described above. As a result, the first, second and third accelerating contactors operate in sequence, bringing the motor 22 up to full speed in the "lower" direction in the minimum time permitted by the timing relays 204 and 206.

There is a "lower plug time relay" 301 which is similar to the "hoist plug time relay" 181 described above. The relay 301 has an operating winding 303 which is normally energized and becomes deenergized to commence the timing interval when the "lower" contactor 122 is operated. The upper terminal of winding 303 is connected directly to the negative conductor 179. The lower terminal of winding 303 is normally connected to the positive conductor 153 through a circuit comprising a conductor 304 and a set of normally closed auxiliary contacts 305 of the "lower" contactor 122. Thus, when the winding 131 of "lower" contactor 122 is energized from segment 276, as described above, the auxiliary contacts 305 open immediately to start the timing interval of the "lower" plug time relay 301. At the expiration of its time interval the time relay 301 closes its contacts 306 to operate the first accelerating contactor 188.

With the controller 64 in its "#3—lower" position, conductors 187 and 211 are energized by segments 296 and 297, respectively, so that the first, second and third accelerating contactors close in a sequence at time intervals determined by relays 301, 204 and 226 thereby bringing the motor 22 up to full speed in the "lower" direction by progressively interconnecting junctions 195—196—197, 217—218—219 and 236—237—238 to decrease the rotor circuit resistance of motor 22.

When running at full speed in the "lower" direction, regenerative braking effects inherently tend to restrain the motor 22 from over-running synchronous speed.

*Movement from position No. 3 to position No. 2—lower*

When the controller 64 is moved from its position "#3—lower" to position "#2—lower," the countertorque relay 291 is locked in and remains locked in. Segments 296 and 297 disengage stationary contacts 189 and 212, respectively, thereby dropping out the three accelerating contactors 188, 207 and 177. This resets the timing relays 204 and 226 and introduces the full resistance of resistor bank 109 into the rotor circuit of motor 22. At the same time, segment 276 disengages stationary contact 278 deenergizing conductor 277 and winding 131 so that "lower" contactor 122 releases deenergizing the stator terminals 101, 102 and 103 of motor 22 and resetting time relay 301.

The countertorque segment 268 engages its cooperating stationary contact 307 in positions "#2—lower" and "#1—lower." This energizes the operating winding 130 of "hoist" contactor 121 through a circuit comprising a conductor 308, the closed contacts 295 of countertorque relay 291 which remains locked in, conductor 171, and "hoist" limit switch 172. The contacts 176 of the third accelerating contactor 177 being closed, the winding 130 of "hoist" contactor 121 may be energized through the closed auxiliary contacts 175 of "lower" contactor 122 as described above for position "#1—hoist." This energizes the stator of motor 22 in the "hoist" direction with the full resistance of resistor bank 109 connected in its rotor circuit to apply a countertorque to the motor 22 and retard the lowering of the downwardly moving grab 7.

*Movement from position No. 2 to position No. 1—lower*

When controller 64 is moved from its "#2—lower" to its "#1—lower" position, the connections remain as in position "#2—lower" except that a segment 309 engages the stationary contact 189. The segment 309 is connected to the segment 251 by a connection 311. This energizes conductor 187 to cause operation of the first accelerating contactor 188 as soon as the time interval of the "hoist" plug relay 181 expires. The resistors 198, 199 and 210 are thereby short circuited and an increased countertorque is applied to motor 22 in the "#1—lower" position as controller 64 is returned toward the "off" position from its "#3—lower" position. The second and third accelerating contactors 207 and 177 do not operate, however, because stationary contact 212 remains deenergized.

*Plugging overcurrent protection*

To prevent overcurrent in the rotor of motor 22, a plugging relay 312 is provided. The plugging relay 312 comprises a direct current operating winding 313 and a set of normally open contacts 314. The operating winding 313 is connected to the direct current output terminals 316 and 317 of a full wave bridge type dry disc rectifier 319. The A. C. input terminals 320 and 321 of rectifier 319 are connected directly across the resistor 244 of resistor bank 109. Rectifier terminal 320 is connected by a conductor 323 directly to a terminal 324 at the lower end of resistor 244. The other rectifier input terminal is connected by a conductor 325 and the conductor 233 to junction point 238 at the upper end of resistor 244. The plugging relay 312 therefore operates whenever the A. C. voltage across resistor 244 exceeds a predetermined maximum value corresponding to excessive current in the rotor of motor 22.

Under such overload conditions, contacts 314 close and connect the windings 303 and 184 of the two plugging time relays 301 and 181 in multiple. One or the other of the windings 303 and 184 will be energized, regardless of the direction of rotation of the motor 22. As a result, both time relays 301 and 181 will be operated. They will then have their contacts 306 and 183 simultaneously open which positively drops out the first accelerating contactor 188. This, in turn, rests the timing relays 204 and 226 and drops out the second and third accelerating contactor 188. This, in turn, resets the timing relays 204 sistance of resistor bank 109 into the rotor circuit, whereby plugging relay 312 will release. If the controller 64 is positioned to call for full speed in either direction, the motor 22 will thereafter be automatically re-accelerated to the full speed condition in the desired direction.

*Close control*

Referring to Fig. 8, the close control comprises a controller 65 operated by the lever 55 shown in Fig. 6. The controller 65 has an "off" position, three "close" positions and three "open" positions, the "open" and "close" positions being in opposite directions from the "off" position. There is a three phase A. C. supply comprising conductors 330, 331 and 332. The supply conductors 330, 331 and 332 are connected through a knife switch 333 and overload protective devices 334 and 335 to "open" and "close" contactors 336 and 337, respectively.

There is also a D. C. supply 336 which is connected to the control circuits through a knife switch 337 and fuses 338. A conductor 340 extends from the negative side of D. C. supply 336 through contacts 341 and 342 of overload devices 334 and 335 and a further conductor 343 to the lower terminal of the operating winding 344 of a D. C. undervoltage relay 345.

There is an A. C. undervoltage relay 347 which has an operating winding 348 and a set of contacts 349 which open when winding 348 is deenergized. So long as A. C. power is available on conductors 331 and 332, the contacts 349 are closed.

A jamming time relay 351 of the fast operating slow release type comprises an operating winding 352 and a set of contacts 353 which close immediately upon energization of the winding 352. The contacts 353 open after a predetermined time interval following the deenergization of winding 352. The negative conductor 340 extends directly to the upper terminal of winding 352. The lower terminal of winding 352 is connected through the normally closed contacts 355 of a jamming relay 356 and a conductor 357 to the positive side of the D. C. supply. The winding 352 is therefore energized except when the jamming relay contacts 355 are open as described below. The contacts 353 of jamming time relay 351 are therefore normally closed.

The positive conductor 357 also extends to a stationary contact 359 of controller 65. A further stationary contact 360 is connected to the contact 359 by segments 361 and 363 which are interconnected by a connection 364. The segments 361 and 363 interconnect the stationary contacts 359 and 360 only in the "off" position of controller 65. In the "off" position of controller 65, a connection is established from positive conductor 357 to the upper terminal of the D. C. undervoltage relay 345 through a circuit comprising contacts 359 and 360, a conductor 365, the closed contacts 353 of jamming time relay 351, a conductor 367 and the closed contacts 349 of A. C. undervoltage relay 347. The D. C. undervoltage relay 345 is thus operated. A locking circuit is established by closure of a set of contacts 368 of D. C. undervoltage relay 345. Contacts 368 connect conductors 357 and 365 together independently of controller 65 so that the D. C. undervoltage relay 345 remains operated when the controller 65 is moved from its "off" position and contacts 359 and 360 are disconnected from each other. This also maintains stationary contact 360 energized under control of the D. C. undervoltage relay 345. The D. C. undervoltage relay 345, when energized, also closes a set of contacts 369 which connect a conductor 371 to the negative conductor 340.

*Position No. 1—close*

When controller 65 is moved from its "off" position to its "#1—close" position, a segment 372 engages the stationary contact 360 instead of the segment 363. Segment 372 remains in engagement with contact 360 in all three "close" positions of controller 65. Another segment 373 is connected to segment 372 by a connection 375. The segment 373 engages a stationary contact 376 in all three "close" positions of controller 65. The stationary contact 376 is connected by a conductor 377 and through normally closed auxiliary contacts 379 of "open" contactor 336 to the right hand terminal of the operating winding 380 of "close" contactor 337. The left hand terminal of winding 380 is connected to the negative conductor 371. This operates "close" contactor 337 which then connects line conductors 330, 331 and 332 to stator terminals 381, 382 and 383 respectively of "close" motor 14. The rotor slip-ring terminals 385, 386 and 387 are connected to a resistor bank 388. In position "#1—close" the full resistance of resistor bank 388 is connected in the rotor circuit of motor 14. This causes a reduced closing force to be applied to the grab bucket 7.

*Position No. 2—close*

In position "#2—close" a further segment 389 engages a stationary contact 390. The segment 389 is in engagement with contact 390 in positions "#2—close" and "#3—close" of controller 65. The segment 389 is connected to the segment 372 by connections 375 and 391. A conductor 393 connects the stationary contact 390 to the right hand terminal of the operating winding 394 of a first accelerating contactor 395. The left hand terminal of operating winding 394 is connected to the negative conductor 371. This causes operation of the first accelerating contactor 395. Operation of contactor 395 short-circuits an end group of resistors 396 to reduce the resistance in the rotor circuit of motor 14 and increase its torque. An increased closing force is thereby applied to the grab 7.

*Position No. 3—close*

In position "#3—close" a segment 397 engages a stationary contact 398. This engagement takes place in this position only. The contact 398 is connected by a conductor 399 to the contacts 400 of an acceleration timing relay 401.

The timing relay 401 has a winding 403, the upper terminal of which is connected to the negative conductor 371. The lower terminal of winding 403 is connected by a conductor 404 and through auxiliary contacts 405 of accelerating contactor 395 to the positive conductor 365.

Timing relay 401 is therefore energized and its contacts 400 are open until accelerating contactor 395 closes in "#2—close" position. The relay 401 is of the fast operating slow release type and commences its timing interval upon the operation of accelerating contactor 395. Energization of conductor 399 in position "#3—close" is therefore ineffective unless timing relay 401 has had sufficient time to close its contacts 400. With contacts 400 closed, the conductor 399 is connected through a further conductor 406 to the operating winding 408 of a second accelerating contactor 409. Contactor 409 then operates to short-circuit an intermediate group of resistors 410 and increase the stator current of motor 14 to its maximum value.

*Jammed or stalled condition—close*

A group of limiting resistors 412 in resistor bank 388 remains connected at all time. These resistors limit the pull on closing line 18 to value about sufficient to lift the grab 7 when empty but insufficient to lift the grab 7 when loaded. Under these conditions, the stalled rotor current of motor 14 becomes sufficient to produce a voltage drop across one of the limiting resistors 412 which is great enough to operate the jamming relay 356.

The jamming relay 356 comprises an operating winding 413 which is connected to the D. C. output terminals of a rectifier 414. The A. C. input of rectifier is connected across the uppermost of the three limiting resistors 412. The rectifier 414 is similar to the rectifier 319 described above. When the pull on the closing line 18 reaches its maximum value which is somewhat less than holding capacity of the one-way brake 19, the jamming relay 356 operates and opens its contacts 355. The opening of contacts 355 starts the timing interval of the jamming time delay relay 351. At the expiration of this time interval, the contacts 353 of the jamming time delay relay 351 open and release the D. C. undervoltage relay 345. With the D. C. undervoltage relay released, the winding 380 of "close" contactor 337 is deenergized and power is cut off from the stator terminals of motor 14. With motor 14 shut off, the load on the closing line 18 is immediately seized and held by the one-way brake 19. During closing operation, it is not necessary to release the brake 19.

*Position No. 1—open*

In its "#1—open" position, a segment 416 engages the stationary contact 360. In moving from a "close" position in which the D. C. undervoltage relay 345 has been unlocked by the jamming time relay 351, the controller 65 passes through its "off" position in which stationary contacts 359 and 360 are connected together and the D. C. undervoltage relay 345 is thereby re-operated to restore current for operation of the control circuits. Accordingly, the stationary contact 360 is energized when it is engaged by the segment 416. Another segment 417 is connected to the segment 416 by a connection 418. The segment 416 engages the stationary contact 360 in all three "close" positions of controller 65. The segment 417 similarly engages a stationary contact 420 in all three "close" positions of controller 65.

Stationary contact 420 is connected by a conductor 421 and normally closed contacts 422 of "close" contactor 337 to a further conductor 423 which extends to the right hand terminal of the operating winding 424 of the "open" contactor 336. The conductor 423 also extends to the right hand terminal of the operating winding 426 of a brake release contactor 427. The brake release contactor 427 is a two pole contactor having two normally open poles 429 and 430. When the winding 426 is energized, the contactor 427 connects the positive and negative conductors 357 and 340, respectively, to the operating winding 433 of brake release solenoid 20. This releases the one-way brake 19 permitting the closing line 18 to be paid out whereby the grab 7 is opened. At the same time, "open" contactor 336 operates to connect the stator terminals 381, 382, 383 to line conductors 332, 331 and 330, respectively. Power is thus applied to the motor 14 to open grab 7 with maximum resistance in its rotor circuit.

*Positions No. 2 and No. 3—open*

The circuits for positions "#2—open" and "#3—open" of controller 65 are similar to those described above for positions "#2—close" and "#3—close" whereby operation of accelerating contactors 395 and 409 produces sequential reductions in the resistance connected in the rotor circuit of motor 14.

A segment 434 engages the stationary contact 390 in the "#2—open" and "#3—open" positions of controller 65. Another segment 435 engages the stationary contact 398 in the "#3—open" position only. The segments 435 and 435 are connected to the segment 416 by connections 418, 436 and 437. The segments 434 and 435 energize the conductors 393 and 399, respectively in the same manner as the segments 389 and 397 described above.

*Trolley control*

Figure 9:
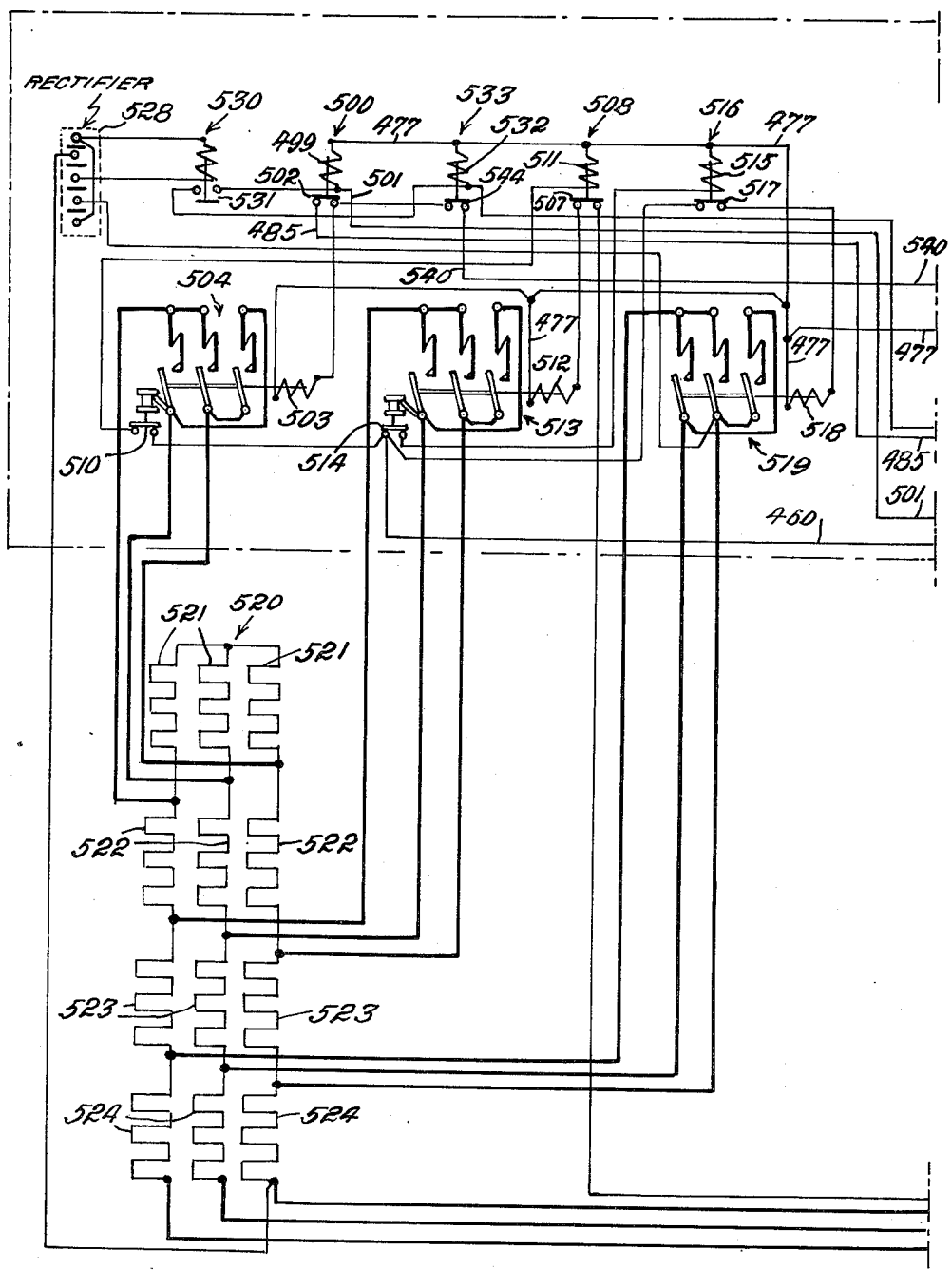

Referring to Fig. 9, the trolley control comprises two three-position switches 70 and 71. The switches 70 and 71 are independently operable by the latches or control levers 58 and 59, respectively, shown in Fig. 6. The operator will generally be sitting or standing so that the grab 7 is traversed toward his left or toward his right. With the "hoist" control lever 54 grasped in his left hand, the latch 58 associated with the "hoist" lever 54 will preferably cause the grab 7 to move toward his left by operation of its associated switch 70. The latch 59 will accordingly be operated by his right hand which will move the grab 7 toward the operator's right.

As shown in Fig. 9, the switch 70 is operated for causing leftward movement of the grab 7 and the switch 71 for movement toward the right. Three-phase power from line conductors 441, 442 and 443 passes through a three pole knife switch and through overload devices 445 and 446. An A. C. undervoltage relay 448 comprises an operating winding 449 and a set of contacts 450. The winding 449 is connected to the power supply conductors 442 and 443 so that contacts 450 are closed while A. C. power is available on line conductors 442 and 443 and the knife switch 444 is closed.

A D. C. supply line 452 is connected through a knife switch 453 and fuses 454 to positive and negative conductors 445 and 446. A D. C. undervoltage relay 458 comprises an operating winding 459. The upper terminal of winding 459 is connected through the closed contacts 450 of A. C. undervoltage relay 448 to a conductor 460. The conductor 460 extends to a stationary contact 461 of switch 70. There is another stationary contact 462 in switch 70. The stationary contacts 461 and 462 are connected together only in the "off" position of switch 70 by a pair of interconnected segments 463 and 464. The stationary contact 462 of switch 70 is connected by a conductor 466 to a stationary contact 467 of switch 71. There is another stationary contact 468 in switch 71. The stationary contacts 467 and 468 of switch 71 are connected together only in the "off" position of switch 71 by a pair of interconnected segments 469 and 470. The stationary contact 468 is connected to the positive conductor 455. With both switches 70 and 71 in their "off" position, the lower terminal of D. C. undervoltage relay winding 459 is connected to the positive conductor 455 through contacts 467—468 of switch 71, conductor 466, contacts 461—462 of switch 70, conductor 460, and contacts 450 of the A. C. undervoltage relay 448. The lower terminal of winding 459 is connected to the negative conductor 456 through the closed contacts 472 and 473 of overload protection devices 445 and 446 and a conductor. This energizes D. C. undervoltage relay 458 causing it to close a set of contacts 475.

With the D. C. undervoltage relay locked in, the switches 70 and 71 may be moved from their respective "off" positions without deenergizing conductor 460. An additional set of contacts 476 of undervoltage relay 458 connects the negative conductor 456 to a further negative conductor 477. The conductor 477 extends to various operating windings as described in greater detail below. If either undervoltage relay drops out, both switches 70 and 71 must be placed simultaneously in their "off" positions before the D. C. undervoltage relay 458 can be re-operated.

*Position No. 1—left*

When switch 70 is moved to its "#1—left" position, a segment 479 engages a stationary contact 480. The stationary contact 480 is connected to the stationary contact 461 for energization from the positive conductor 460. Segment 479 engages stationary contact 480 in the "#1—left" and "#2—left" positions of switch 70. A segment 481 is connected to segment 479 and engages a stationary contact 482 in the "#1—left" and "#2—left" positions of switch 70.

When segment 481 engages stationary contact 482, positive conductor 460 is connected via a conductor 484 through a "left" limit switch 484, a conductor 485, normally closed auxiliary contacts 486 of a "right" contactor 487, and a conductor 488 to the operating winding 489 of a "left" contactor 490. The other side of winding 489 is connected to negative conductor 477. This operates the "left" contactor 490 which then closes its main contacts connecting the line conductors 441, 442 and 443 to the stator terminals 493, 492 and 491, respectively, of the trolley motor 43.

At the same time, the "left" contactor 490 closes a set of auxiliary contacts 491 to connect positive conductor 460 via a conductor 492 to the operating winding 493 of a brake release contactor 494. The other side of winding 493 is connected to the negative conductor 477. The brake contactor 493 thereupon closes its two poles 495 and 496 to energize the brake releasing winding 497 of brake 53 and thus free the racking drum 46 of the trolley machine 12 for traversing movement of the grab 7.

The "left" contactor 490 also opens a pair of auxiliary contacts 498. The auxiliary contacts 498 are included in the energizing circuit of the operating winding 499 of a "left" plugging time relay 500. The timing relay 500 is of the fast operating slow release type like the other timing relays described above. The winding 499 is connected to the contacts 498 by a conductor 501 and through contacts 498, when closed, to the positive conductor 460. The other side of winding 499 is connected to the negative conductor 477. Thus, opening of auxiliary contacts 498 starts the timing interval of relay 500 which closes its contacts 502 at the expiration of the predetermined time interval for which it is set. Conductor 485, which is energized in position "#1—left" of switch 70, is then connected through the contacts 502 to energize the operating winding 503 of a first accelerating contactor 504.

*Position No. 2—left*

When switch 70 is moved to its "#2—left" position, a segment 505 engages and energizes a stationary contact 506. The stationary contact 506 is connected to the contacts 507 of a timing relay 508 by a conductor 509.

When the first accelerating relay 504 operates, it opens a set of auxiliary contacts 510 which in turn open the energizing circuit for the winding. The timing relay 508 then begins its timing interval whereafter its contacts 507 are closed. If the switch 70 is in its position "#2—left" at the time of closure of contacts 507 thereafter, contacts 507 will energize the operating winding 512 of the second accelerating contactor 513.

Operation of the second accelerating contactor 513 opens its auxiliary contacts 514 which are included in the energizing circuit of the winding 515 of another accelerating timing relay. At the expiration of the time interval for which timing relay 516 is set, it closes its contacts 517 to energize the operating winding 518 of a third accelerating contactor 519. The three accelerating contactors 503, 513 and 519 thus operate in sequence with a minimum delay between the operations of successive accelerating contactors being determined by the timing relays 500, 508 and 516. The second and third accelerating contactors 513 and 519 may be prevented from operating by leaving the switch 70 in its "#1—left" position without advancing it to its full speed "#2—left" position.

The accelerating contactors 504, 513 and 519 are connected to short-circuit successive portions of a resistor bank 520. The resistors 521 are short-circuited by the first accelerating contactor 504. The next group of resistors 522 is short-circuited by the second accelerating contactor 513. A final group of resistors 523 is short-circuited by the third accelerating contactor 519. A group of resistors 524 remains Y-connected to the rotor slipring terminals 525, 526 and 527 with the third accelerating contactor 519 operated which provides a certain minimum value of resistance in the rotor circuit of motor 43. As the accelerating contactors 504, 513 and 519 operate successively, the resistance in the rotor circuit of motor 43 is progressively decreased for accelerating the motor.

The extreme right hand resistor of the three resistors 524 is connected to the A. C. input of a rectifier 528. The D. C. output of rectifier 528 is connected to the operating winding 529 of a plugging relay 530. If the rotor current becomes excessive, the plugging relay 530 operates and closes its contacts 531. The contacts 531 connect the winding 499 of the "left" plugging timing relay 500 in multiple with the operating winding 532 of a "right" plugging timing relay 533. A circuit will always be established, as described in greater detail below, for the energization of one or the other of the two plugging timing relays 500 or 533. This causes both relays 500 and 533 to be energized simultaneously, thereby operating whichever one was previously released for operation of the first accelerating contactor 504. Contactor 504 then drops out and closes its contacts 510 operating time delay relay 508 which then opens its contacts 507 to release the second accelerating contactor 513. Upon being released, the second accelerating relay closes its contacts 517 to operate timing relay 516 which then opens its contacts 517 and drops out the third accelerating contact 519. Maximum resistance is thereby connected to the rotor circuit of motor 43 and the plugging relay 530 will release thereby permitting re-acceleration of motor 43 in the desired direction of rotation.

*Position No. 1—right*

The switch 71 is provided with a segment 535 which engages the stationary contact 467 in positions "#1—right" and "#2—right." The segment 535 is connected with another segment 536 which engages a stationary contact 537 in positions "#1—right" and "#2—right." Positive conductor 460 is then connected to stationary contact 539 through contacts 461 and 462 of switch 70, conductor 466, stationary contact 467, segment 535 and segment 536. This requires that switch 70 shall be in its "off" position. If switch 70 is moved from its "off" position, the circuit between stationary contacts 461 and 462 is broken and stationary contact 482 of switch 70 is energized from positive conductor 460 instead of the contact 537 of switch 71. Thus, if switches 70 and 71 are operated from their "off" positions simultaneously, the switch 70 will prevail.

The stationary contact 537 of switch 71 is connected via a conductor 538 to the contacts of a limit switch 539. The contacts of limit switch 539 are closed except when the grab 7 is at its limit of its travel toward the right. The circuit extends from limit switch 539 via a conductor 540 to normally closed auxiliary contacts 541 of "left" contactor 490. From contacts 541 the circuit continues via a conductor 542 to the right hand terminal of the operating winding 543 of "right" contactor 487. The left hand terminal of operating winding 543 is connected to the negative conductor 477. Energization of operating winding 543 causes the "right" contactor 487 to close its main contacts whereby the line conductors 441, 442 and 443 are connected to the stator terminals 491, 492 and 493, respectively, this being in the opposite order from the connections established by the "left" contactor 490.

The conductor 540 from limit switch 539 also extends to contacts 544 of "right plugging time relay" to operate the first accelerating contactor 504 when contacts 544 close at the end of the time interval of timing relay 533. The "right" contactor 487 also opens a set of normally closed auxiliary contacts 545 which deenergize the operating winding 532 of time relay 533 causing it to start its timing interval. A pair of normally open auxiliary contacts 546 are closed to energize the winding 493 of brake release contactor 494 and release the brake 53.

*Position No. 2—right*

In position "#2—right" a segment 547 of switch 71 which is connected to segment 535 engages a stationary contact 548. This engagement energizes the conductor 509 and causes operation of the second and third accelerating contactors 513 and 519 as described above for position "#2—left."

From the foregoing, it will be apparent that fast, smooth and safe operation of the grab 7 may be effected by the operator by simple hand movements of a substantially instinctive nature. Automatic tension equalization in the hoisting and closing lines is provided. The closing of the grab, if not completed by the operator, is automatically completed when slack is taken out of the hoisting line 26 since the closing line 18 is simultaneously reeled in on drum 25 along with hoisting line 26.

It will be apparent to those skilled in the art that changes and modifications may be made in the embodiments of the invention herein specifically disclosed without departing from the spirit and scope of the invention as defined in the appended claims.

What is claimed is:

1. Unloading apparatus comprising a grab bucket having holding and closing lines, a hoisting machine having a double drum to which one end of both the closing and holding lines are connected, a motor for driving said drum and powered to lift the fully loaded bucket, the opposite end of the holding line being dead-ended and a closing machine having a drum to which the opposite end of the closing line is connected, a motor for driving said closing line drum and of limited torque sufficient only to lift the empty bucket and an automatic, one-way brake for said closing drum faced to release in the bucket closing direction of rotation and to automatically engage and hold in the bucket opening direction of rotation and limited to holding the weight of the empty bucket and whereby said closing machine will automatically lift and hold to the extent of the weight of the empty bucket but the hoisting machine will be capable of overhauling the closing machine to automatically equalize the load on the holding and closing lines in accordance with combined operation of said hoisting machine motor, closing machine motor and said automatic one-way brake for the closing drum.

2. Unloading apparatus comprising a grab bucket having holding and closing lines, a hoisting machine having a double drum to which one end of each of the closing and holding lines is connected, a motor for driving said drum and powered to lift the fully loaded bucket, the opposite end of the holding line being dead-ended, a closing machine having a drum to which the opposite end of the closing line is connected, a motor for driving said closing line drum and limited in torque to the lifting of the empty bucket, an automatic, one-way brake acting on said closing line drum limited to holding the weight of the empty bucket and arranged to release when the closing motor is on and to hold when the closing motor is off, and a timer connected to automatically cut off the closing motor and transfer the load to the closing brake a predetermined time after stalling of the limited torque motor.

3. Unloading apparatus comprising a grab bucket having holding and closing lines, a hoisting machine having a double drum to which one end of each of the closing and holding lines is connected, a motor for driving said drum and powered to lift the fully loaded bucket, the opposite end of the holding line being dead-ended, a closing machine having a drum to which the opposite end of the closing line is connected, a motor for driving said closing line drum and limited in torque to the lifting of the empty bucket, an automatic, self-releasing and self-energizing with rotation in opposite directions one-way brake acting on said closing line drum limited to holding the weight of the empty bucket and arranged to release when the closing motor is on and to hold when the closing motor is off, and a one-way self-energizing and self-releasing with rotation in opposite directions automatic brake for said hoisting machined drum arranged to hold when the hoisting motor is off and to release when the hoisting motor is on.

4. Unloading apparatus comprising a grab bucket having holding and closing lines, a hoisting machine having a double drum to which one end of each of the closing and holding lines is connected, a motor for driving said drum and powered to lift the fully loaded bucket, the opposite end of the holding line being dead-ended, a brake for said hoisting drum arranged to permit free fall of the bucket, a closing machine having a drum to which the opposite end of the closing line is connected, a motor for driving said closing line drum and limited in torque to the lifting of the empty bucket, an automatic, one-way brake acting on said closing lined drum limited to holding the weight of the empty bucket and arranged to release when the closing motor is on and to hold when the closing motor is off, a timer connected to automatically cut off the closing motor and transfer the load to the closing brake a predetermined time after stalling of the limited torque closing motor and a timer on the hoisting drum brake for limiting the overhauling speed of the hoist motor under free fall conditions.

5. Unloading apparatus comprising a grab bucket having holding and closing lines, a hoisting machine having a double drum to which one end of each of the closing and holding lines is connected, a motor for driving said drum and powered to lift the fully loaded bucket, the opposite end of the holding line being dead-ended, a closing machine having a drum to which the opposite end of the closing line is connected, a motor for driving said closing line drum and limited in torque to the lifting of the empty bucket, an automatic, one-way brake acting on said closing line drum limited to holding the weight of the empty bucket and arranged to release when the closing motor is on and to hold when the closing motor is off, a one-way self-energizing and self-releasing automatic brake for said hoisting machine drum arranged to hold when the hoisting motor is off and to release when the hoisting motor is on, and a timer conected to control application of said hoisting drum brake under free fall conditions of said hoisting drum.

References Cited in the file of this patent
UNITED STATES PATENTS

| | | |
|---|---|---|
| 729,869 | Hunt | June 2, 1903 |
| 1,008,361 | Norris | Nov. 14, 1911 |
| 1,068,070 | Norris | July 22, 1913 |
| 1,181,980 | Norris | May 2, 1916 |
| 1,358,128 | Watson | Nov. 9, 1920 |
| 1,968,493 | Kersting | July 31, 1934 |